United States Patent
Suzuki et al.

(10) Patent No.: US 6,646,015 B1
(45) Date of Patent: Nov. 11, 2003

(54) PROCESS FOR PRODUCING DIANTIMONY PENTOXIDE SOL

(75) Inventors: Keitaro Suzuki, Sodegaura (JP); Yoshinari Koyama, Sodegaura (JP); Motoko Asada, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 10/419,130

(22) Filed: Apr. 21, 2003

(30) Foreign Application Priority Data

May 7, 2002 (JP) .......................................... 2002-131291

(51) Int. Cl.[7] .............................. B05D 7/00; B01F 17/00
(52) U.S. Cl. ....................... 516/36; 106/286.2; 427/215; 428/689
(58) Field of Search ......................... 427/215; 428/689; 106/286.2; 516/36

(56) References Cited

U.S. PATENT DOCUMENTS

| | | | |
|---|---|---|---|
| 5,582,909 A | * | 12/1996 | Watanabe et al. |
| 5,707,552 A | * | 1/1998 | Watanabe et al. |
| 5,756,009 A | * | 5/1998 | Watanabe et al. |
| 6,180,224 B1 | * | 1/2001 | Shouji et al. |
| 6,311,545 B1 | * | 11/2001 | Tamaki et al. |

FOREIGN PATENT DOCUMENTS

JP  A 2-107523  4/1990

* cited by examiner

*Primary Examiner*—Morton Foelak
(74) *Attorney, Agent, or Firm*—Oliff & Berridge, PLC

(57) ABSTRACT

The present invention provides a process for producing a diantimony pentoxide sol, characterized in that a diantimony pentoxide sol having a particle size of 5 to 30 nm is used as a nuclear sol and the sol is grown to an arbitrary particle size, preferably a particle size of 40 to 300 nm. The process comprises adding a hydrogen peroxide solution and diantimony trioxide into a sol comprising diantimony pentoxide particles as a raw material, and coating the diantimony pentoxide particles with a resulting antimony compound, preferably diantimony pentoxide. In the process, the coating is preferably carried out in such a manner that a particle size of particles in a sol as a raw material increases by a factor of 1.3 to 60.

7 Claims, No Drawings

PROCESS FOR PRODUCING DIANTIMONY PENTOXIDE SOL

BACKGROUND OF THE INVENTION

1. Field of the Art

The present invention relates to a process for producing a diantimony pentoxide sol, characterized in that a diantimony pentoxide sol having a particle size of 5 to 30 nm is used as a nuclear sol and the sol is grown to an arbitrary particle size, preferably a particle size of 40 to 300 nm.

2. Description of the Related Art

Diantimony pentoxide sols are used as fire retardant auxiliaries for plastics, fibers and the like, microfillers for surface treatment of glass or plastics, inorganic ion exchangers, and so on. Generally, sols having a high concentration (30 to 50% in terms of $Sb_2O_5$) stabilized with an organic base are used for the above-mentioned purpose.

Conventionally, it is known that diantimony pentoxide sols are prepared according to the following methods.

The methods reported hitherto include a method in which an alkali antimonate is deionized with a cation exchange resin (Japanese Patent Publication No. 52-21298, U.S. Pat. No. 4,110,247 or Japanese Patent Publication No. 57-11848), and a method in which diantimony trioxide is oxidized with hydrogen peroxide solution at high temperatures (Japanese Patent Publication No. 53-20479, and Japanese Patent Laid-open Nos. 52-21298, 52-131998, 52-123997, 60-137828 and 2-180717).

As methods other than the above-mentioned ones, are known a method in which an alkali antimonate is reacted with an inorganic acid, and then a peptization is carried out (Japanese Patent Laid-open Nos. 60-41536 and 61-227918) and the like.

In addition, Japanese Patent Laid-open No 2-107523 reports a process for producing $Sb_2O_5$ sol having a particle size of 40 to 300 nm and a particle shape of regular octahedron, in which an alkali antimonate is reacted with a mono- or divalent inorganic acid in a stoichiometric ratio of 1:0.7 to 5 to give a diantimony pentoxide gel, the gel is separated and washed with water to give a wet cake, and the wet cake is added and peptized intermittently or continuously into a diantimony pentoxide sol.

The prior processes for producing diantimony pentoxide sol as mentioned above have the following disadvantages.

The ion exchange method has characteristics that the resulting diantimony pentoxide sol is excellent in dispersion properties and can be mixed into a medium in a high concentration because the sol is nearly spherical. However, it is difficult to perform an ion exchange in a diantimony pentoxide concentration of 10% and more in this method. Further, this method has disadvantages that it includes tedious processes for separating and regenerating ion exchange resins.

Further, the oxidation method affords directly a sol comprising diantimony pentoxide in a high concentration as much as about 30%, but the sol has a high viscosity, and has low dispersion properties as the colloidal particles have irregular shapes, and further has a bad compatibility with resin emulsion or the like as the sol has a high surface activity. As a method in order to improve the stability of diantimony pentoxide sol obtained by the oxidation method, it is proposed to add an acid comprising pentavalent phosphorus or arsenic in an amount of 0.01 mole or above on the basis of 1 mole of Sb when a diantimony pentoxide sol is produced (Offenlegungsschrift No. P 2931523). However, the polymerization of antimonic acids is markedly depressed due to phosphoric acid or arsenic acid and thus polyantimonate ion or fine colloidal diantimony pentoxide particles with a particle size of 5 nm or less is produced. Therefore, the resulting sol has disadvantages that it has very high viscosity and rises remarkably in viscosity upon storage.

SUMMARY OF THE INVENTION

An object of the present invention is to provide a process for preparing industrially a sol comprising diantimony pentoxide with large particle size, which eliminates the above-mentioned disadvantages in the prior processes for preparing diantimony pentoxide sol.

In order to achieve the object, the present invention as a first aspect provides a process for producing a sol comprising diantimony pentoxide particles coated with an antimony compound, characterized in that the process comprises adding a hydrogen peroxide solution and diantimony trioxide into a sol comprising diantimony pentoxide particles as a raw material to give antimony compound in the sol, and coating the diantimony pentoxide particles with the resulting antimony compound.

A second aspect of the present invention is the process as set forth in the first aspect, wherein the antimony compound which is coated on the diantimony pentoxide particles is diantimony pentoxide.

A third aspect of the present invention is the process as set forth in the first or second aspect, wherein the coating is carried out in such a manner that a particle size of particles in a sol as a raw material increases by a factor of 1.3 to 60.

A fourth aspect of the present invention is the process as set forth in any one of the first to third aspects, wherein the sol as a raw material is a sol comprising diantimony pentoxide particles having a particle size of 5 to 30 nm.

A fifth aspect of the present invention is the process as set forth in any one of the first to fourth aspects, wherein the sol obtained by coating is a sol comprising diantimony pentoxide particles having a particle size of 40 to 300 nm.

A sixth aspect of the present invention is the process as set forth in any one of the first to fifth aspects, wherein the coating with an antimony compound is carried out by adding a hydrogen peroxide solution and diantimony trioxide in $H_2O_2/Sb_2O_3$ molar ratio of 2 to 2.5 into a diantimony pentoxide sol as a raw material, and then heating.

A seventh aspect of the present invention is the process as set forth in any one of the first to sixth aspects, wherein the addition of the hydrogen peroxide solution and diantimony trioxide is carried out by any one of the following method i), ii) or iii):

method i): the hydrogen peroxide solution and diantimony trioxide are added alternately into the diantimony pentoxide sol;

method ii): the hydrogen peroxide solution is first added into the diantimony pentoxide sol, and then diantimony trioxide is added thereinto; or method iii): a mixed slurry of the hydrogen peroxide solution and diantimony trioxide is added into the diantimony pentoxide sol.

DESCRIPTION OF THE PREFERRED EMBODIMENTS

As mentioned above, the present invention relates to a process for producing a sol comprising diantimony pentoxide particles coated with an antimony compound, characterized in that the process comprises adding a hydrogen peroxide solution and diantimony trioxide into a sol comprising diantimony pentoxide particles as a raw material, and coating the diantimony pentoxide particles with a resulting antimony compound.

The antimony compound which are coated on the diantimony pentoxide particles is one obtained by the reaction of diantimony trioxide with hydrogen peroxide. The antimony compound is diantimony pentoxide or antimony oxides comprising diantimony pentoxide as a main component.

In the process, the coating is carried out in such a manner that a particle size of particles in a sol as a raw material grows and increases by a factor of 1.3 to 60.

More specifically, the present invention relates to a process for producing a sol comprising enlarged diantimony pentoxide particles, in which the process comprises adding a hydrogen peroxide solution and diantimony trioxide into a sol comprising diantimony pentoxide particles as a raw material, and coating the diantimony pentoxide particles with a resulting diantimony pentoxide in such a manner that a particle size of the particles increases by a factor of 1.3 to 60.

The particle size of the diantimony pentoxide particles in the diantimony pentoxide sol used as raw material is not limited. Generally, a sol comprising diantimony pentoxide particles having a particle size of 5 to 30 nm is used, and a sol comprising particles grown and having a particle size of 40 to 300 nm is obtained.

The present invention includes a process for enlarging further a particle size of diantimony pentoxide particles, in which a sol comprising diantimony pentoxide of which the particle size is enlarged by the process of the present invention is used as raw material.

The characteristics of the present invention resides mainly in the enlargement of particle in a sol (raw material sol) containing diantimony pentoxide particles having a particle size of 5 to 30 nm by coating the surface of the particle in raw material sol with diantimony pentoxide in such a manner that a particle size of the particle becomes 40 to 300 nm.

The methods for coating with antimony compounds, particularly diantimony pentoxide include, for example a production of an antimonic acid or fine colloidal diantimony pentoxide by the reaction of hydrogen peroxide with diantimony trioxide, and heating.

The particle size of diantimony pentoxide sol particles used as raw material sol in the present invention is, for example a primary particle size of 5 to 100 nm, and preferably 5 to 30 nm. As the diantimony pentoxide sols, ones prepared by known methods can be used. Particles in these sols act as nuclear particles. The diantimony pentoxide sols may be acidic, neutral or basic, and are preferably acidic.

The methods for preparing the above-mentioned diantimony pentoxide sols include, for example a method comprising deionizing an alkali antimonate (Japanese Patent Publication No. 57-11848 and U.S. Pat. No. 4,110,247), a method comprising oxidizing diantimony trioxide with hydrogen peroxide at high temperatures (Japanese Patent Publication Nos. 53-20479 and 52-21298, and Japanese Patent Laid-open Nos. 60-137828 and 2-180717) or a method comprising peptizing with an amine a diantimony pentoxide gel obtained by reacting sodium antimonate with an acid, which the present inventors developed (Japanese Patent Laid-open No. 60-41536).

The method comprising preparing and heating antimonic acid or fine colloidal diantimony pentoxide prepared by the reaction of hydrogen peroxide with diantimony trioxide, comprises adding a hydrogen peroxide solution and diantimony trioxide into a diantimony pentoxide sol as a raw material and heating the resulting mixture.

As the above-mentioned diantimony trioxide, one having a mean particle size of 100 $\mu$m or less is used, and particularly one having the particle size of 10 $\mu$m or less is preferable from the viewpoint of dispersibility, reactivity with hydrogen peroxide solution and so on.

In the coating, a hydrogen peroxide solution and diantimony trioxide are generally used in $H_2O_2/Sb_2O_3$ molar ratio of 2.0 to 2.5, and preferably 2.0. The conversion of diantimony trioxide into diantimony pentoxide is insufficient when the molar ratio is less than 2.0, while the conversion is sufficient but $H_2O_2$ is in excess thereby causing economical problems when the molar ration is more than 2.0.

The reaction is carried out at a temperature of 30 to 200° C., preferably 80 to 100° C.

Diantimony pentoxide for forming the coating layer of the present invention is preferably added in terms of diantimony trioxide added in such a manner that the molar ration of ($Sb_2O_3$ added)/($Sb_2O_5$ in diantimony pentoxide sol as a raw material) is 1 and more. Although the molar ratio of less than 1 can be used, the effect on the growth of particles (the enlargement of the particle size of particles in diantimony pentoxide sol as raw material) is low.

The addition of the hydrogen peroxide solution and diantimony trioxide can be carried out continuously or intermittently. In addition, a mixed slurry of the hydrogen peroxide solution and diantimony trioxide can be added into the diantimony pentoxide sol or diantimony trioxide can be added after hydrogen peroxide is added previously into the diantimony pentoxide sol. Further, the hydrogen peroxide solution and diantimony trioxide can be added alternately into the diantimony pentoxide sol. In this case, the order of the addition of diantimony trioxide and hydrogen peroxide solution is not specifically limited. In the above-mentioned methods, it is preferable to add finally diantimony trioxide and hydrogen peroxide solution in $H_2O_2/Sb_2O_3$ molar ratio of 2.0.

As the reaction by the addition of diantimony trioxide and hydrogen peroxide solution is an oxidative exothermic reaction, it is preferable to perform the reaction with cooling of the reactor or under reflux. When diantimony trioxide and hydrogen peroxide solution are added intermittently, the addition is carried out at 10- to 20-minute intervals alternately. The amount to be added for once is suitably in a molar ratio ($Sb_2O_3$ added)/($Sb_2O_5$ in diantimony pentoxide sol as raw material) of about 0.1 to 1.0. Although there is no problem that the molar ratio is less than 0.1, the number of addition becomes larger, and therefore the reaction is time-consuming and is not efficient. In addition, there is no problem that the molar ratio is more than 1.0, the amount added for once becomes larger, a calorific value becomes higher, and it becomes difficult to control the temperature. Further, in the latter case, independent small particles are newly produced, and thereby the particle growth becomes uneven and particle size is widely distributed. Thus, it is not preferable when particles with sharp particle size distribution should be produced.

It is assumed that diantimony trioxide added in the present invention is subject to an oxidative reaction with hydrogen peroxide in the system to give fine diantimony pentoxide colloidal particles, and that the colloidal particles are bonded on the surface of colloidal particles of diantimony pentoxide sol (acting as a nuclear particle) present in the system and thereby the particle growth takes place. The higher the ratio of diantimony trioxide to diantimony pentoxide previously introduced as a nuclear particle is, the larger the particle size of the resulting sol becomes.

The diantimony pentoxide sol produced by the present invention has a pH of 2 to 4. The pH can be controlled to a value of 4 to 11 with an addition of an inorganic base, such as lithium hydroxide, sodium hydroxide, potassium hydroxide or ammonia, alkanolamines, such as triethanolamine or monoethanolamine, alkylamines, such as triethylamine or n-propylamine, an organic base, such as quaternary ammonium hydroxide or guanidine hydroxide.

When the concentration of the resulting sol should be high, it can be concentrated by a general method, such as evaporation method or ultrafiltration method. In order to improve further the stability of the sol, it is preferable to be concentrated after controlling the pH of the sol to a value of 5 to 8 with the above-mentioned bases, in particular organic bases.

According to the process for producing diantimony pentoxide sols of the present invention, the particle size of particles in a diantimony pentoxide sol can be arbitrarily controlled and the particles have a sharp particle size distribution. Therefore, the sols prepared by the present invention are excellent in dispersion properties, and useful for fire retardant auxiliaries for plastics, fibers and the like, microfillers for surface treatment of glass or plastics, inorganic ion exchangers, and so on.

EXAMPLES

Reference Example 1

This example shows preparation of a diantimony pentoxide sol used as a raw material for preparing a sol of the present invention.

When 203.8 g of diantimony trioxide (produced by Guangdong Mikuni Antimony Industries Co., Ltd.; amount of $Sb_2O_3$: 99.5 wt %) and 270.5 g of 35 wt % hydrogen peroxide solution were added into 2225.6 g of pure water and heated at 80° C., the reaction was started and the temperature of the mixed solution rose to 95 to 100° C. due to reaction heats. Then, 203.8 g of diantimony trioxide was further added thereto, maturation was carried out at a temperature of 90 to 95° C. for 2 hours to complete the reaction, and 2903.7 g of the intended diantimony pentoxide sol was obtained. The obtained sol had a specific gravity of 1.152, a viscosity of 2.6 c.p., a pH of 3.50 and $Sb_2O_5$ amount of 15.5 wt %. In addition, the observation with an electron microscope showed that particles in the sol had a primary particle size of 15 to 20 nm.

Reference Example 2

This example shows preparation of another diantimony pentoxide sol used as a raw material for preparing a sol of the present invention.

800 g of sodium antimonate (64 wt % of $Sb_2O_3$ and 12.27 wt % of $Na_2O$ was contained) was added into 1532 g of water to give a slurry. Then, 396 g of 35% hydrochloric acid was added into the slurry and warmed at 27° C. And, the reaction was carried out at the temperature for 3 hours. Subsequently, the resulting slurry of diantimony pentoxide was filtered with suction, and washed with 3200 g of water. 755 g of the resulting diantimony pentoxide gel wet cake was dispersed in 1952.7 g of water, and then, after 9.1 g of 85% orthophosphoric acid was added, the temperature was elevated to 85° C. and peptization was carried out at the temperature for 2 hours, and 2716.8 g of the intended diantimony pentoxide sol was obtained. The obtained sol had a specific gravity of 1.202, a pH of 2.12, a viscosity of 6.4 c.p. and $Sb_2O_5$ amount of 17.8 wt %. In addition, the observation with an electron microscope showed that particles in the sol had a primary particle size of 10 to 20 nm.

Example 1

After 1451.6 g of the diantimony pentoxide sol prepared in Reference Example 1 was warmed to 75° C., 81.0 g of diantimony trioxide (produced by Guangdong Mikuni Antimony Industries Co., Ltd.; amount of $Sb_2O_3$: 99.5 wt %) and 53.8 g of 35 wt % hydrogen peroxide solution were added thereto at 10- to 15-minute intervals 8 times in total alternately and intermittently to allow to react. In the course of the reaction, the temperature of the reacting liquid was kept at 90 to 99° C. while cooling. The total amount of diantimony pentoxide for forming a coating layer was such an amount as the molar ration of ($Sb_2O_3$ added)/($Sb_2O_5$ in diantimony pentoxide sol as raw material) was 3.18 in case where the total amount was calculated to the amount of diantimony trioxide added. In addition, the amount of diantimony trioxide and hydrogen peroxide solution added for forming the coating layer corresponded to 2.0 in $H_2O_2/Sb_2O_3$ molar ratio.

To the resulting sol, 47.0 g of triethanolamine was added, and concentrated by an evaporation method to give 1898.5 g of the intended diantimony pentoxide sol. The obtained sol had a specific gravity of 1.766, a pH of 4.70, a viscosity of 7.4 c.p. and $Sb_2O_5$ amount of 49.5 wt %. As to particle size, the observation with an electron microscope showed that particles in the sol had a primary particle size of 40 to 50 nm.

Example 2

300 g of the diantimony pentoxide sol prepared in Reference Example 1, 1910.8 g of water and 270.7 g of 35 wt % hydrogen peroxide solution were charged in a reactor, heated at 90° C., and 40.8 g of diantimony trioxide (produced by Guangdong Mikuni Antimony Industries Co., Ltd.; amount of $Sb_2O_3$: 99.5 wt %) was added thereto under reflux at 15- to 20-minute intervals, 10 times in total intermittently to allow to react. The total amount of diantimony pentoxide for forming a coating layer was such an amount as the molar ration of ($Sb_2O_3$ added)/($Sb_2O_5$ in diantimony pentoxide sol as raw material) was 9.69 in case where the total amount was calculated to the amount of diantimony trioxide added. In addition, the amount of diantimony trioxide and hydrogen peroxide solution added for forming the coating layer corresponded to 2.0 in $H_2O_2/Sb_2O_3$ molar ratio.

Thus, 2876 g of diantimony pentoxide sol was obtained. The sol had a specific gravity of 1.168, a pH of 2.35, a viscosity of 1.1 c.p. and $Sb_2O_5$ amount of 17.2 wt %. As to particle size, the observation with an electron microscope showed that particles in the sol had a primary particle size of 150 to 200 nm.

Example 3

2584.3 g of water was weighed out in a reactor, and 40.8 g of diantimony trioxide (produced by Guangdong Mikuni Antimony Industries Co., Ltd.; amount of $Sb_2O_3$: 99.5 wt %) and 270.7 g of 35 wt % hydrogen peroxide were added thereto with stirring, and heated at 90° C. to allow to react, and thereby a sol containing particles as a raw material was prepared. The sol had a primary particle size of 15 to 20 nm as a result of observation with an electron microscope.

Thereafter, 40.8 g of diantimony trioxide was added thereto at 10-minute intervals 9 times in total intermittently to allow to react. The total amount of diantimony pentoxide for forming a coating layer was such an amount as the molar ration of ($Sb_2O_3$ added)/($Sb_2O_5$ in diantimony pentoxide sol as raw material) was 10.0 in case where the total amount was calculated to the amount of diantimony trioxide added. In addition, the amount of diantimony trioxide and hydrogen peroxide solution added for forming the coating layer corresponded to 2.0 in $H_2O_2/Sb_2O_3$ molar ratio.

Thus, 2895 g of diantimony pentoxide sol was obtained. The sol had a specific gravity of 1.144, a pH of 2.30, a viscosity of 1.5 c.p. and $Sb_2O_5$ amount of 15.0 wt %. As to particle size, the observation with an electron microscope showed that particles in the sol had a primary particle size of 40 to 50 nm.

Example 4

108.6 g of the diantimony pentoxide sol prepared in Reference Example 2 and 809.8 g of water were charged in a reactor and heated to 90° C. Then, 17.5 g of diantimony trioxide (produced by Guangdong Mikuni Antimony Industries Co., Ltd.; amount of $Sb_2O_3$: 99.5 wt %) and 11.7 g of 35 wt % hydrogen peroxide solution were added thereto at 15-minute intervals 8 times in total alternately and intermittently to allow to react. The total amount of diantimony pentoxide added for forming a coating layer was such an amount as the molar ration of ($Sb_2O_3$ added)/($Sb_2O_5$ in diantimony pentoxide sol as raw material) was 8.0 in case where the total amount was calculated to the amount of diantimony trioxide added. In addition, the amount of diantimony trioxide and hydrogen peroxide solution added for forming the coating layer corresponded to 2.0 in $H_2O_2/Sb_2O_3$ molar ratio.

Thus, 1151 g of diantimony pentoxide sol was obtained. The obtained sol had a specific gravity of 1.144, a pH of 2.54, a viscosity of 1.4 c.p. and $Sb_2O_5$ amount of 15.1 wt %. As to particle size, the observation with an electron microscope showed that particles in the sol had a primary particle size of 40 to 50 nm.

Example 5

518.4 g of water, 4.5 g of diantimony trioxide (produced by Guangdong Mikuni Antimony Industries Co., Ltd.; amount of $Sb_2O_3$: 99.5 wt %) and 240.3 g of 35 wt % hydrogen peroxide solution were charged in a reactor, heated at 90° C. to allow to react and thereby a diantimony pentoxide sol as a raw material was prepared. The sol had a primary particle size of 10 to 15 nm as a result of observation with an electron microscope. Then, a slurry in which 357.7 g of diantimony trioxide was dispersed into 459.9 g of water was added to the reactor with a metering pump under reflux continuously over about 2 hours to allow to react. The total amount of diantimony pentoxide for forming a coating layer was such an amount as the molar ration of ($Sb_2O_3$ added)/($Sb_2O_5$ in diantimony pentoxide sol as raw material) was 79.5 in case where the total amount was calculated to the amount of diantimony trioxide added. In addition, the amount of diantimony trioxide and hydrogen peroxide solution added for forming the coating layer corresponded to 2.0 in $H_2O_2/Sb_2O_3$ molar ratio.

Thus, 1538.9 g of diantimony pentoxide sol was obtained. The sol had a specific gravity of 1.244, a pH of 2.30, a viscosity of 1.5 mPa.s and $Sb_2O_5$ amount of 25.3 wt %. As to particle size, the observation with an electron microscope showed that particles in the sol had a primary particle size of 80 to 90 nm.

Example 6

Into a reactor, 243.2 g of water, 12.5 g of diantimony pentoxide sol prepared in Example 5 as a raw material sol and 156.3 g of 35 wt % hydrogen peroxide solution were charged, and heated under reflux. Then, a slurry in which 235.5 g of diantimony trioxide (produced by Guangdong Mikuni Antimony Industries Co., Ltd.; amount of $Sb_2O_3$: 99.5 wt %) was dispersed into 353.2 g of water was added to the reactor with a metering pump continuously over about 2 hours to allow to react. The total amount of diantimony pentoxide for forming a coating layer was such an amount as the molar ration of ($Sb_2O_3$ added)/($Sb_2O_5$ in diantimony pentoxide sol as raw material) was 82.3 in case where the total amount was calculated to the amount of diantimony trioxide added. In addition, the amount of diantimony trioxide and hydrogen peroxide solution added for forming the coating layer corresponded to 2.0 in $H_2O_2/Sb_2O_3$ molar ratio.

Thus, 1000.7 g of diantimony pentoxide sol was obtained. The sol had a specific gravity of 1.264, a pH of 2.20, a viscosity of 2.5 c.p. and $Sb_2O_5$ amount of 26.3 wt %. As to particle size, the observation with an electron microscope showed that particles in the sol had a primary particle size of 180 to 200 nm.

What is claimed is:

1. A process for producing a sol comprising diantimony pentoxide particles coated with an antimony compound, in which the process comprises adding a hydrogen peroxide solution and diantimony trioxide into a sol comprising diantimony pentoxide particles as a raw material, and coating the diantimony pentoxide particles with a resulting antimony compound.

2. The process according to claim 1, wherein the antimony compound which is coated on the diantimony pentoxide particles is diantimony pentoxide.

3. The process according to claim 1, wherein the coating is carried out in such a manner that a particle size of particles in a sol as a raw material increases by a factor of 1.3 to 60.

4. The process according to claim 1, wherein the sol as a raw material is a sol comprising diantimony pentoxide particles having a particle size of 5 to 30 nm.

5. The process according to claim 1, wherein the sol obtained by coating is a sol comprising diantimony pentoxide particles having a particle size of 40 to 300 nm.

6. The process according to claim 1, wherein the coating with an antimony compound is carried out by adding a hydrogen peroxide solution and diantimony trioxide in $H_2O_2/Sb_2O_3$ molar ratio of 2 to 2.5 into a diantimony pentoxide sol as a raw material, and then heating.

7. The process according to claim 1, wherein the addition of the hydrogen peroxide solution and diantimony trioxide is carried out by any one of the following method i), ii) or iii):

method i): the hydrogen peroxide solution and diantimony trioxide are added alternately into the diantimony pentoxide sol;

method ii): the hydrogen peroxide solution is first added into the diantimony pentoxide sol, and then diantimony trioxide is added thereinto; or method iii): a mixed slurry of the hydrogen peroxide solution and diantimony trioxide is added into the diantimony pentoxide sol.

* * * * *